(12) United States Patent
Miura et al.

(10) Patent No.: US 6,315,093 B1
(45) Date of Patent: Nov. 13, 2001

(54) HYDRAULIC SHOCK ABSORBER

(75) Inventors: Toshiya Miura; Tadashi Miyazawa, both of Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 09/694,317

(22) Filed: Oct. 24, 2000

(30) Foreign Application Priority Data

Nov. 5, 1999 (JP) .................................................. 11-314944
Apr. 27, 2000 (JP) .................................................. 12-127203

(51) Int. Cl.[7] .............................. F16F 9/50; B60G 11/56
(52) U.S. Cl. ......................... 188/282.1; 267/34; 188/268
(58) Field of Search ............................. 267/34, 35, 64.11, 267/64.25, 120; 188/268, 280, 282.1, 287, 298, 322.18, 322.22

(56) References Cited

U.S. PATENT DOCUMENTS

| | | | |
|---|---|---|---|
| 3,919,509 | * 11/1975 | Schnitzius | 267/64.11 |
| 4,044,865 | * 8/1977 | Tournen | 188/287 |
| 4,342,447 | * 8/1982 | Marx | 188/298 |
| 4,474,271 | * 10/1984 | Molders et al. | 188/280 |
| 4,632,228 | * 12/1986 | Oster et al. | 188/282 |
| 4,749,071 | * 6/1988 | Taylor | 188/322.19 |
| 6,129,343 | * 10/2000 | Ecarnot | 267/64.11 |

* cited by examiner

*Primary Examiner*—Christopher P. Schwartz
(74) *Attorney, Agent, or Firm*—Rabin & Berdo, P.C.

(57) ABSTRACT

A hydraulic shock absorber (10) is composed of a piston (3) that partitions the inside of a cylinder (1) into an extension side chamber (R1) and a compression side chamber (R2), a throttler (3c) for connecting the extension side chamber (R1) and the compression side chamber (R2), a piston rod (2) that extends from the cylinder (1) interlocking with the piston (3), an accumulator (11) that allows entrance and exit of a volume of hydraulic operating fluid equivalent to the volume of a portion of the piston rod (2) entered within the cylinder (1), and a spring (8) that pushes the piston (3) against the piston rod (2).

8 Claims, 4 Drawing Sheets

HYDRAULIC SHOCK ABSORBER

TECHNICAL FIELD

The present invention relates to a small hydraulic shock absorber to be used for a door of a furniture or the like.

BACKGROUND ART

Generally, a hydraulic shock absorber is composed of a piston which partitions the inside of a cylinder into an extension side oil room and a compression side oil room, an orifice for connecting the extension side oil room and the compression side oil room, a piston rod which extends from the cylinder interlocking with the piston, and an accumulator which allows entrance and exit of a hydraulic operating fluid equivalent to the volume of an entered portion of the piston rod in the cylinder.

SUMMARY OF THE INVENTION

However, conventional hydraulic shock absorbers have complicated inner structure. Thus, the problem is such that miniaturization is difficult and moreover high precision in processing is required and an increase in cost of products involves in order to realize the miniaturization.

An object of the present invention is to provide structure suitable for small hydraulic shock absorbers.

In order to achieve above the object the present invention provides a hydraulic shock absorber comprising: a piston which partitions an inside of a cylinder into an extension side oil room and a compression side oil room; throttling means for connecting the extension side oil room and the compression side oil room; a piston rod which is provided separately from the piston and extends from the cylinder interlocking with the piston; an accumulator which allows entrance and exit of a hydraulic operating fluid equivalent to volume of an entered portion of the piston rod in the cylinder; and a spring which pushes the piston against the piston rod.

The present invention further provides a hydraulic shock absorber comprising: a groove formed at an end surface of the piston with which the piston rod comes into contact, wherein the throttling means are formed at a center section of the piston and open at the groove.

The present invention further provides a hydraulic shock absorber comprising: an annular passage which is formed between an outer circumference of the piston and an inner circumference of the cylinder and connects the extension side oil room and the compression side oil room; and a piston ring which is provided at an outer circumference of the piston and opens and closes the annular passage, wherein the piston ring operates as a compression side check valve which opens for a flow of a hydraulic operating fluid from the extension side oil room to the compression side oil room.

The present invention further provides a hydraulic shock absorber having: the accumulator comprising: an elastic body room in which an elastic body is stored; and a gas chamber which is partitioned by the elastic body, and the gas chamber is connected with the extension side oil room via the elastic body room.

The present invention further provides a hydraulic shock absorber comprising: a bearing member which is provided at the cylinder and supports the piston rod slidably, wherein the elastic body room and the gas chamber are provided between the bearing member and the cylinder, and the elastic body is cylindrical and provided between the bearing member and the cylinder.

The present invention further provides a hydraulic shock absorber comprising: a bush composed of an elastic member installed at a tip of the piston rod which is extending from the cylinder.

The details as well as other features and advantages of the invention are set forth in the remainder of specification and are shown in accompanying drawings.

DESCRIPTION OF THE PREFERRED EMBODIMENTS

Embodiments of the present invention will subsequently be described with reference to the accompanying drawings.

Figure 1:
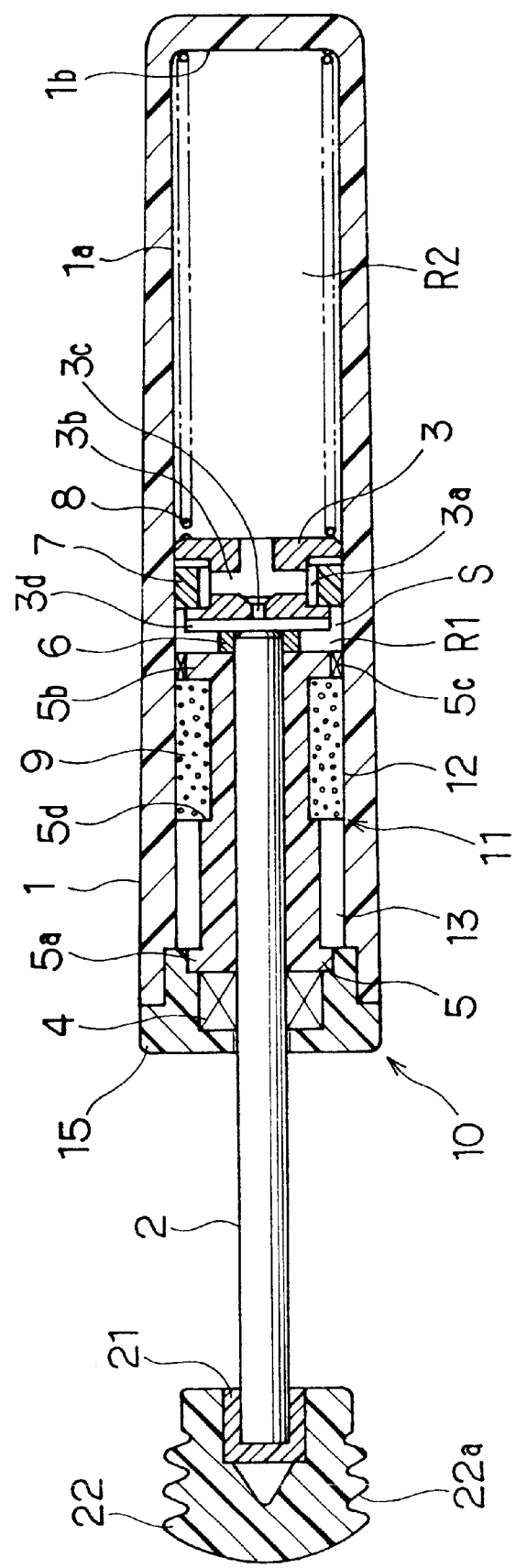
FIG. 1 is a sectional view showing a hydraulic shock absorber according to an embodiment of the present invention.

Referring to FIG. 1, a hydraulic shock absorber 10 is composed of a circular cylinder 1, a piston rod 2, a piston 3, and an accumulator 11.

The piston 3 partitions the inside of the cylinder 1 into an extension side oil room R1 and a compression side oil room R2. The piston rod 2 extends from the cylinder 1 interlocking with the piston 3. The accumulator 11 allows entrance and exit of a hydraulic operating fluid equivalent to the volume of an entered portion of the piston rod 2 in the cylinder 1.

The cylinder 1 has a circular cylinder section 1a and its bottom section 1b. The cylinder section 1a retains the piston 3 slidably. These sections are molded with resin as one body so as to form the cylinder 1.

A closure 15 made of resin is installed at the opening end of the cylinder 1. An annular oil seal 4 is provided between the closure 15 and the piston rod 2. Due to the oil seal 4, leakage of the hydraulic operating fluid is prevented.

The piton rod 2 is slidably supported at the cylinder 1 in an axial direction through a bearing member 5 which is made of resin. The bobbin-shaped bearing member 5 has flange sections 5a and 5b at its both ends. The flange section 5a is fixed to the closure 15 and the flange section 5b fixed to the cylinder 1.

A ring 6 is installed at a cylinder side end which projects from the bearing member 5 of the piston rod 2. The ring 6 is in contact with an end surface of the flange section 5b of the bearing member 5, therefore the piston rod 2 does not come out.

The piston rod 2 and the piston 3 are separated each other. The piston 3 is pushed against the piston rod 2 by a spring 8. The piston 3 follows the piston rod 2 due to pushing force of the spring 8. The coil-shaped spring 8 is installed in such a state that it is compressed between the piston rod 2 and the bottom section 1b of the cylinder 1.

The piston 3 has an orifice 3c as a throttling means which connects the extension side oil room R1 and the compression side oil room R2. The orifice 3c is arranged coaxially with the piston rod 2. Also, the orifice 3c is formed at an axis center section of the piston 3.

An opening groove 3d is formed at an end surface of the piston 3 with which the piston rod 2 comes into contact. The orifice 3c opens at the groove 3d. The groove 3d is formed in such a manner that it extends in a direction of diameter passing through the axis center section of the piston 3. The groove 3d is used for preventing the orifice 3c from being closed by the piston rod 2 which comes into contact with the end surface of the piston 3.

An annular passage S is formed between the piston 3 and the cylinder 1. Further, an annular groove 3a in a shape of concave which opens toward the annular passage S is formed at an outer circumferential section of the piston 3. The annular groove 3a leads to the extension side oil room R1 through the annular passage S and also leads to the compression side oil room R2 through a passage 3b which is formed at the piston 3.

A piston ring 7 for opening and closing the annular passage S is slidably installed at the annular groove 3a in an axial direction of the piston 3. When the piston ring 7 made of resin is assembled to the piston 3, it is fixed to the annular groove 3a with its abutment opened.

Figure 2:
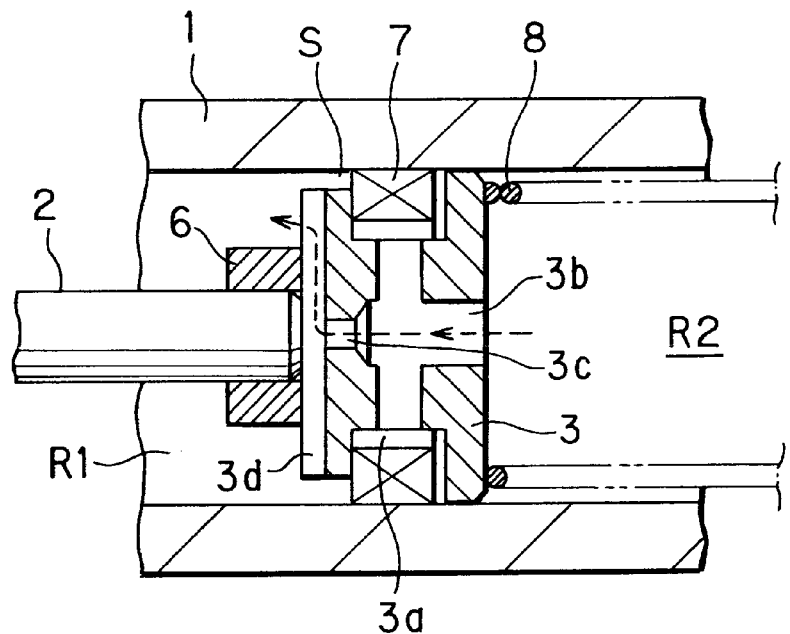
FIG. 2 is a sectional view showing a piston section at the time of operation on a compression side of a hydraulic shock absorber according to a first embodiment.

An outer circumferential section of the piston ring 7 is in contact with an inner surface of the cylinder 1, and the piston ring 7 moves in the annular groove 3a according to a direction of movement of the piston 3. Referring to FIG. 2, at the time of operation on the compression side which the piston rod 2 enters in the cylinder 1, the piston ring 7 closes the annular passage S. On the other hand, referring to FIG. 3, at the time of operation on the extension side which the piston rod 2 extends from the cylinder 1, the piston ring 7 opens the annular passage S. In other words, the piston ring 7 serves as a check valve on the compression side which opens for a flow of a hydraulic operating fluid from the extension side oil room R1 to the compression side oil room R2. Thus, as compared with a check valve having a steel ball or the like, the constitution can be simplified and the piston can be miniaturized with a cross sectional area of a passage for hydraulic operating fluids being secured.

The accumulator 11 is composed of an elastic body room 12 in which an elastic body 9 is stored and a gas chamber 13 which is partitioned by the elastic body 9. The gas chamber 13 leads to the extension side oil room R1 through the elastic body room 12.

The elastic body room 12 is formed between the cylinder 1 and the bearing member 5. The elastic body room 12 leads to the extension side oil room R1 through a communicating passage 5c which is formed by notching at the flange section 5b of the bearing member 5.

The elastic body 9 is made, for example, by forming a nitrile rubber foaming body in a shape of cylinder. The elastic body 9 has a lot of independent voids as a whole and shrinks due to a pressure which is led to the elastic body room 12.

An annular step section 5d is formed at a point of an outer circumferential surface of the bearing member 5 which forms the elastic body room 12. The elastic body 9 is installed between the annular step section 5d and the flange section 5b.

The gas chamber 13 is formed as a cylindrical space among the cylinder 1, the bearing member 5, and the closure 15. The gas chamber 13 leads to the extension side oil room R1 through the elastic body room 12 and the communicating passage 5c.

At the time of assembling the hydraulic shock absorber 10, a prescribed amount of hydraulic operating fluid (for example, silicon oil) is filled up in the cylinder 1. Then, the closure 15 or the like is assembled in the cylinder 1 together with the piston rod 2, whereby a prescribed amount of gas (air) is sealed into the cylinder 1.

The hydraulic shock absorber 10 is installed in such a manner that the gas chamber 13 is not positioned lower than the elastic body room 12. Therefore, gas in the cylinder 1 is led to the gas chamber 13 due to its buoyancy.

A bush 22 is installed at a tip of the piston rod 2. The bush 22 is made of soft resin so as to function as an elastic material. The bush 22 having a cylindrical shape is fixed to a hard resin cap 21. The cap 21 is pressed into a tip of the piston rod 2. The bush 22 has a shape of bellows which provides some annular concave sections 22a at its outer circumference. When the push rod 2 comes into contact with an object through the bush 22, the bush 22 is elastically deformed in an axial direction, whereby it is prevented that a loud noise or an oscillation arises.

The constitution is as described above. Next, a description of operation will be given.

Referring to FIG. 2, when the piston rod 2 is compressed, the piston ring 7 closes the annular passage S and a hydraulic operating fluid in the compression side oil room R2 enters into the extension side oil room R1 passing through the orifice 3c as shown by an arrow in the drawing. Damping force arises in a flow of the hydraulic operating fluid due to resistance generated by the orifice 3c, whereby the hydraulic shock absorber 10 slowly shrinks. At this time, a hydraulic operating fluid equivalent to the volume of an entered portion of the piston rod 2 enters into the elastic body room 12 and the gas chamber 13 from the compression side oil room R2 via the communicating passage 5c.

Figure 3:
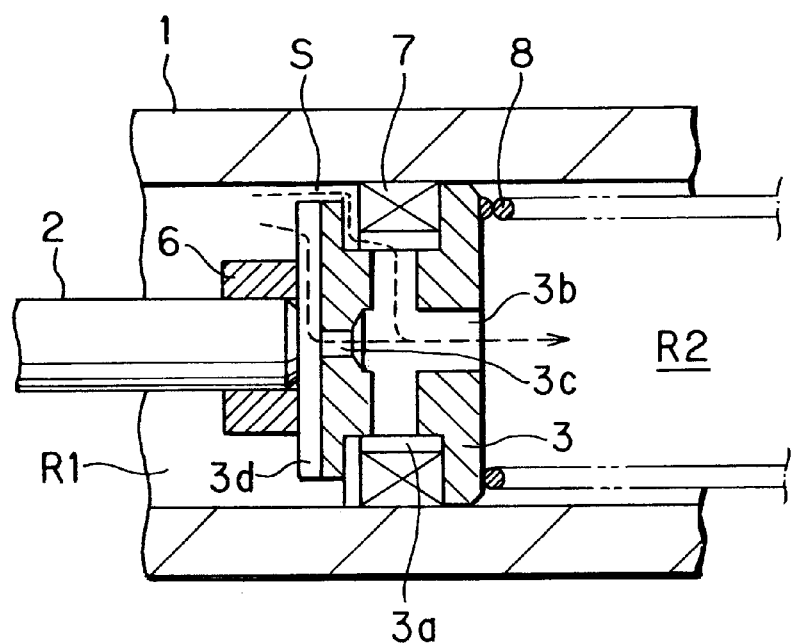
FIG. 3 is a sectional view showing the piston section at the time of operation on an extension side of the hydraulic shock absorber according to the first embodiment.

Referring to FIG. 3, when the piston rod 2 extends, the piston ring 7 opens the annular passage S. Thus, a hydraulic operating in the extension side oil room R1 enters into the compression side oil room R2 passing through the annular passage S and the orifice 3c as shown by an arrow in the drawing. Damping force scarcely arises because an area of a passage becomes large, whereby the hydraulic shock absorber 10 rapidly extends. At this time, a hydraulic operating fluid equivalent to the volume of an entered portion of the piston rod 2 is returned from the gas chamber 13 and the elastic body room 12 to the compression side oil room R2 passing through the communicating passage 5c.

In a state that the hydraulic shock absorber 10 has not been installed yet, gas in the cylinder 1 is distributed in the extension side oil room R1 and the compression side oil room R2. When a several extension and compression are performed after the installation of the hydraulic shock absorber 10, gas in the cylinder 1 enters into the gas chamber 13 via the elastic body room 12. However, the gas which once entered into the gas chamber 13 cannot return to the compression side oil room R2 because of the elastic body 9.

At the time of compression, the piston rod 2 slowly enters into the cylinder 1 due to the damping force. Thus, a hydraulic operating fluid equivalent to the volume of an entered portion of the piston rod 2 flows together with gas from the compression side oil room R2 into the elastic body room 12 via the communicating passage 5c shrinking the elastic body 9. Further, the gas which has flowed into the elastic body room 12 flows into the gas chamber 13. On the other hand, at the time of extension, the piston rod 2 rapidly extends from the cylinder 1. Thus, only the hydraulic operating fluid is returned from the elastic body room 12 to the compression side oil room R2 via the communicating passage 5c and the gas in the gas chamber 13 is shut in there by the elastic body 9.

In such a manner, the gas in the cylinder 1 is collected in the gas chamber 13 and gets out of the extension side oil room R1 and the compression side oil room R2. Therefore, a flow of the hydraulic operating fluid which passes the orifice 3c is not affected by the gas, whereby desired damping characteristic can be obtained.

The accumulator 11 is composed of the elastic body room 12 in which the elastic body 9 is stored and the gas chamber 13 which is partitioned by the elastic body 9. Thus, the constitution can be simplified and the hydraulic shock absorber 10 can be miniaturized.

At the time of assembling the hydraulic shock absorber 10, after a prescribed amount of hydraulic operating fluid is filled in the cylinder 1, the closure 15 or the like is assembled to the cylinder 1 and a prescribed amount of gas is sealed in the cylinder 1. Thus, it is not necessary to carry out a process of removing the gas from the inside of the cylinder 1 at the time of assembling the hydraulic shock absorber 10, whereby productivity is enhanced. Further, it is not necessary to carry out a process of wiping up the hydraulic operating fluid overflowed from the inside of the cylinder 1, thereby enabling to enhance productivity.

The present invention has such constitution that the elastic body room 12 and the gas chamber 13 are formed between the bearing member 5 and the cylinder 1. Thus, it is possible to make the bearing member 5 long utilizing a space for installing the accumulator 11, whereby supporting rigidity of the piston rod 2 can sufficiently be secured.

As a result, it is possible to have constitution such that the piston rod 2 is not connected with the piston 3, and it is possible to avoid an unexpected operation which may occur resulting from an error in assembling both of the piston rod 2 and the piston 3. Thus, the piston rod 2 and the piston 3 do not call for high working accuracy and the piston rod 2 can be formed in a simple shape of circular cylinder. Therefore, the hydraulic shock absorber 10 can be miniaturized, productivity can be enhanced, and product costs can be lowered.

In the present invention, the orifice 3c to be formed at the piston 3 opens at the groove 3d. Therefore, even though the orifice 3c is arranged coaxially with the piston rod 2, the orifice 3c will not be closed by the piston rod 2 and a flow of the hydraulic operating fluid can be secured.

Thus, by forming the orifice 3c at the axis center section of the piston 3, working of the orifice 3c of the piston 3 is facilitated, the hydraulic shock absorber 10 can be miniaturized, and productivity can be enhanced.

The piston ring 7 operates as a check valve which opens for a flow of the hydraulic operating fluid from the extension side oil room R1 to the compression side oil room R2. Thus, as compared with check valves having steel balls or the like, the constitution can be simplified and the piston 3 can be miniaturized with a sectional area of a passage of the hydraulic operating fluid being secured.

Figure 4:
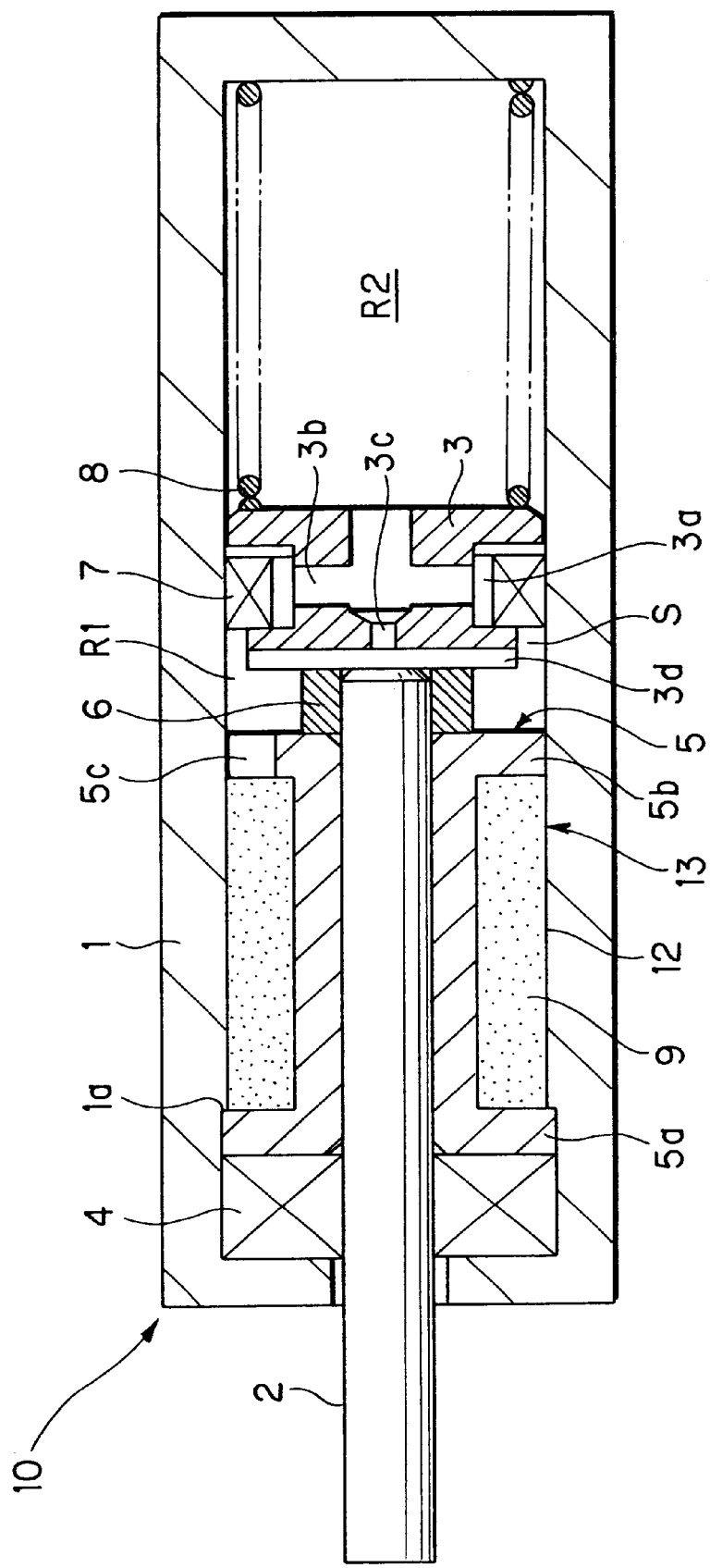
FIG. 4 is a sectional view of a hydraulic shock absorber showing a second embodiment although it is similar to FIG. 1.

Next, referring to FIG. 4, according to a second embodiment, the elastic body room 12 in which the elastic body 9 is stored is provided as the accumulator 11 and the gas chamber which is partitioned by the elastic body according to the first embodiment described above is eliminated. Incidentally, identical numerals are attached to the components same as those of the first embodiment described above.

The cylinder 1 is formed by metal as one body, its opening end section is bent inward, and the annular oil seal 4 is fixed by caulking.

In this case, only a hydraulic operating fluid is filled in the cylinder 1 at the time of assembling the hydraulic shock absorber 10, whereby it is necessary to carry out a process of wiping up the hydraulic operating fluid overflowed from the inside of the cylinder 1 at the time of assembling the hydraulic shock absorber 10 as well as a process of removing gas from the inside of the cylinder 1.

Figure 5:
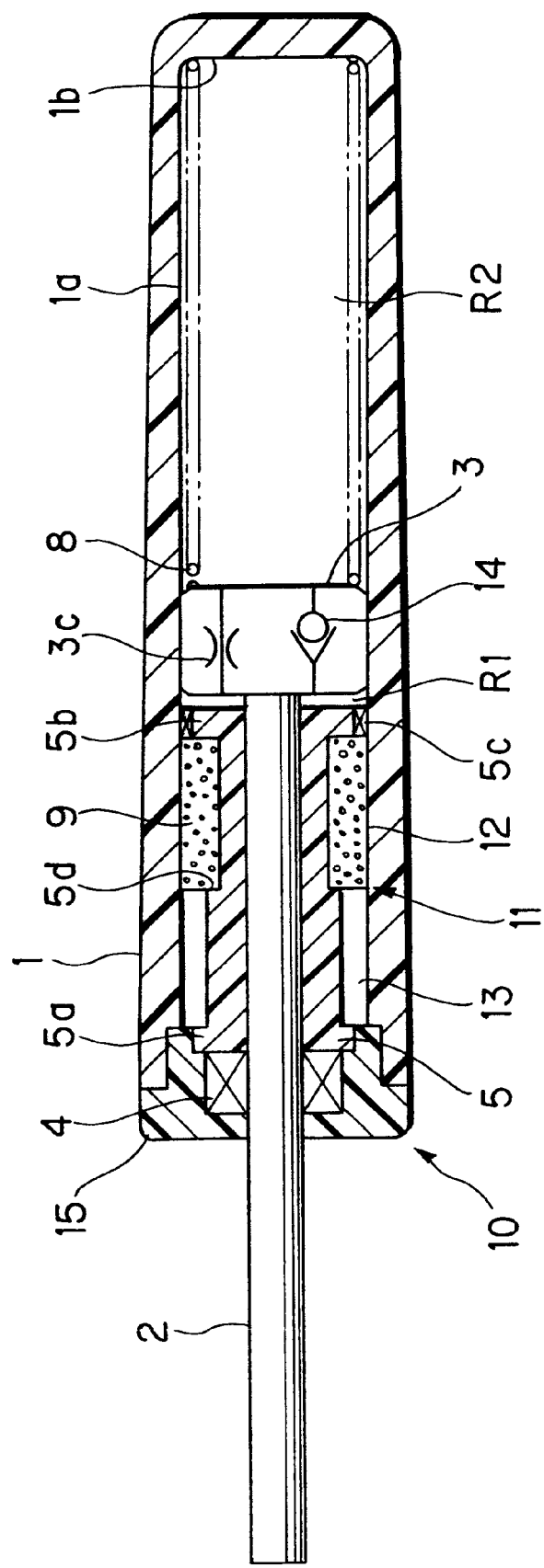
FIG. 5 is a sectional view of a hydraulic shock absorber showing a third embodiment although it is similar to FIG. 1.

Next, referring to FIG. 5, a third embodiment is such that in the first embodiment, a compression side check valve 14 is provided in parallel with the orifice 3c at the piston 3. The compression side check valve 14 may be composed of a steel ball or the like, for example. Incidentally, identical numerals are attached to the components same as those of the first embodiment described above.

The present invention is not restricted to the embodiments described above. It is obvious that various modifications can be made within a scope of technical idea.

What is claimed is:

1. A hydraulic shock absorber, the hydraulic shock absorber comprising:

a cylinder;

a piston, the piston partitioning an interior of the cylinder into an extension side chamber and a compression side chamber, the piston having an end surface;

throttling means for connecting the extension side chamber and the compression side chamber;

a piston rod, the piston rod being separated from the piston and extending from the cylinder according to a movement of the piston, the end surface of the piston having a groove with which the piston rod comes into contact, wherein the throttling means is formed at a center section of the piston and opens into the groove;

an accumulator for providing to and receiving from the interior of the cylinder a volume of a hydraulic operating fluid equivalent to volume of a portion of the piston rod entered within the cylinder, the accumulator receiving the hydraulic operating fluid from the interior of the cylinder when the piston rod move inward of the cylinder and providing the hydraulic operating fluid to the interior of the cylinder when piston rod moves outward of the cylinder; and a spring pushing the piston against the piston rod.

2. A hydraulic shock absorber according to claim 1, wherein the accumulator includes an elastic body, the accumulator having an elastic body retaining space that retains the elastic body, and a gas chamber, the gas chamber being partitioned by the elastic body and being connected with the extension side oil room via the elastic body retaining space.

3. A hydraulic shock absorber according to claim 2, wherein the elastic body is cylindrical, further comprising a bearing member within the cylinder, the bearing member slidably supporting the piston rod, the cylinder having an interior surface surrounding the bearing member in spaced relation thereto so as to define therebetween the elastic body retaining space and the gas chamber, and hold the elastic in the elastic body retaining space, between the bearing member and the cylinder.

4. A hydraulic shock absorber according to claim 2, further comprising a bush composed of an elastic member at a tip of the piston rod outside the cylinder.

5. A hydraulic shock absorber according to claim 2, further comprising a bush composed of an elastic member at a tip of the piston rod outside the cylinder.

6. A hydraulic shock absorber according to claim 1, further comprising:

an annular passage between an outer circumference of the piston and an inner circumference of the cylinder, connecting the extension side chamber and the compression side chamber; and a piston ring at an outer circumference of the piston, opening and closing the annular passage so as to operate as a compression side check valve that opens for a flow of a hydraulic operating fluid from the extension side chamber to the compression side chamber.

7. A hydraulic shock absorber, the hydraulic shock absorber comprising:

a cylinder;

a piston, the piston partitioning an interior of the cylinder into an extension side chamber and a compression side chamber;

throttling means for connecting the extension side chamber and the compression side chamber;

a piston rod, the piston rod being separated from the piston and extending from the cylinder according to a movement of the piston, the piston having an end surface with which the piston rod comes into contact;

an accumulator for providing to and receiving from the interior of the cylinder a volume of a hydraulic operating fluid equivalent to volume of a portion of the piston rod entered within the cylinder, the accumulator receiving the hydraulic operating fluid from the interior of the cylinder when the piston rod moves inward of the cylinder and providing the hydraulic operating fluid to the interior of the cylinder when piston rod moves outward of the cylinder, the accumulator including an elastic body, the accumulator having an elastic body retaining space that retains the elastic body, and a gas chamber, the gas chamber being partitioned by the elastic body and being connected with the extension side chamber via the elastic body retaining space; and a spring pushing the piston against the piston rod.

8. A hydraulic shock absorber according to claim 7, wherein the elastic body is cylindrical, further comprising a bearing member within the cylinder, the bearing member slidably supporting the piston rod, the cylinder having an interior surface surrounding the bearing member in spaced relation thereto so as to define therebetween the elastic body retaining space and the gas chamber, and hold the elastic in the elastic body retaining space, between the bearing member and the cylinder.

* * * * *